United States Patent [19]

Schott

[11] Patent Number: 4,655,614

[45] Date of Patent: Apr. 7, 1987

[54] BEARING RING FOR DRIVE ASSEMBLY HAVING WIDE ANGLE JOINT AND PROTECTIVE FUNNEL

[75] Inventor: Wilhelm Schott, Hennef, Fed. Rep. of Germany

[73] Assignee: Jean Walterscheid GmbH, Lohmar, Fed. Rep. of Germany

[21] Appl. No.: 818,254

[22] Filed: Jan. 13, 1986

[30] Foreign Application Priority Data

Mar. 14, 1985 [DE] Fed. Rep. of Germany ....... 3509128

[51] Int. Cl.⁴ ............................................. F16C 27/00
[52] U.S. Cl. .................................. 384/220; 384/215; 384/441; 384/222
[58] Field of Search ............... 384/220, 441, 222, 106, 384/535, 536, 581, 582

[56] References Cited

U.S. PATENT DOCUMENTS

| 2,936,999 | 5/1960 | Coar et al. | 384/441 |
| 3,369,851 | 2/1968 | Perry et al. | 384/222 |
| 4,357,057 | 11/1982 | Peterson et al. | 384/220 |
| 4,542,996 | 9/1985 | Brissette et al. | 384/222 |

*Primary Examiner*—Lenard A. Footland
*Attorney, Agent, or Firm*—Toren, McGeady and Goldberg

[57] ABSTRACT

A bearing ring for a drive assembly including a protective funnel and a wide angle joint, wherein the bearing ring consists of an outer supporting ring and an inner sliding ring defining an annular space therebetween with flexible webs extending between the supporting ring and the sliding ring and with supporting cams extending radially into the annular space being provided on the supporting ring of a sliding ring. Radial slots with three points of intersection positioned on a joint center line are provided in two places on the sliding ring and in one place on the supporting ring.

3 Claims, 5 Drawing Figures

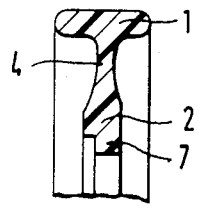
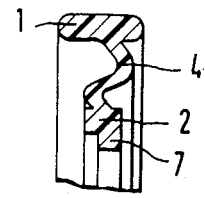
FIG. 3   FIG. 4
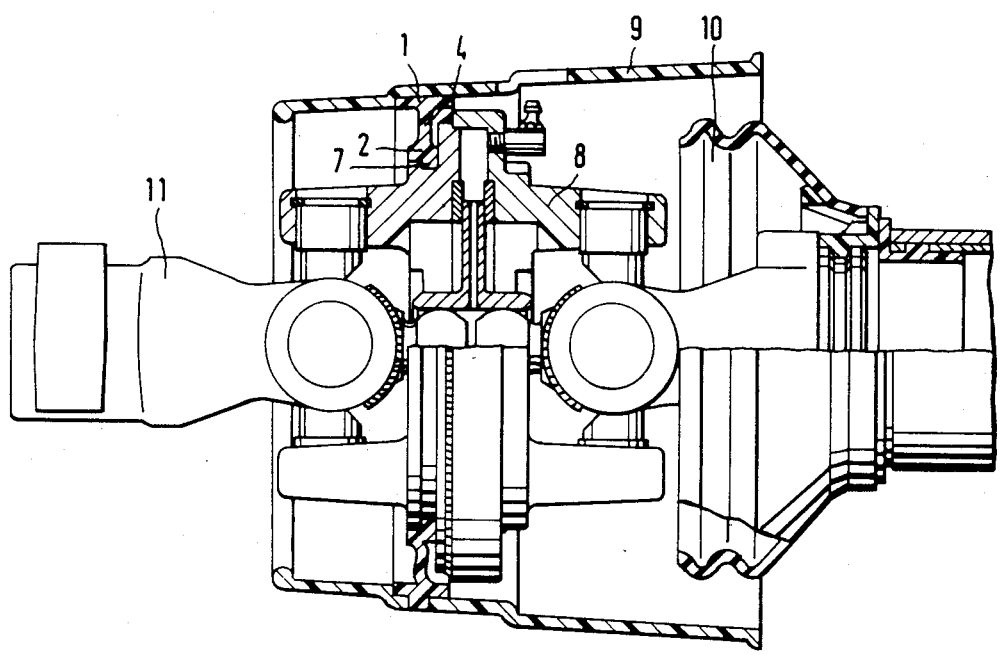
FIG. 5

BEARING RING FOR DRIVE ASSEMBLY HAVING WIDE ANGLE JOINT AND PROTECTIVE FUNNEL

The present invention relates generally to a bearing ring for protective funnels for protecting a wide angle joint associated with a drive assembly particularly for driving agricultural implements or trailers from the power takeoff shaft of a tractor, and more particularly to an assembly, wherein the protective funnel is stationary during operation of the drive assembly being protected via a bearing from the wide angle joint.

A wide angle joint, in the case of which the covering protective device is supported on the outer circumference of the joint, is known in the prior art from DE-OS No. 20 46 236. The disadvantage of the bearing assembly described is that it is completely rigid, an arrangement which limits the achievable angle of the wide angle joint.

The only way of achieving an improvement in such a case would be to do without covering the joint completely, which, however, is not permitted because of the resulting risk of accidents.

It is the object of the present invention to provide a bearing ring for the bearing assembly of a protective device on a wide angle joint which, while covering the joint completely and having a high resistance against radial loads, does not in any way restrict the maximum joint angle.

SUMMARY OF THE INVENTION

Briefly, the present invention relates generally to a bearing ring for a protective funnel for protecting a wide angle joint associated with a drive assembly for driving an agricultural implement from the power takeoff shaft of a tractor. The protective funnel is stationary during operation of the drive assembly and is protected via a bearing ring from the wide angle joint.

In accordance with the invention, the bearing ring consists of an outer supporting ring and an inner sliding ring, the supporting ring and the sliding ring are connected via flexible webs, the supporting ring or the sliding ring is provided with supporting cams extending radially into the annular space formed between the two rings, and the sliding ring, in two places, and the supporting ring, in one place, are provided with radial slots, with the three points of intersection being positioned on a joint center line.

The bearing ring design in accordance with the invention has the advantage of being highly flexible both in the radial and axial directions and of achieving a high degree of radial loadability if the ring without supporting cams comes into contact with such supporting cams.

In an advantageous embodiment of the invention, the flexible webs extend in an arch-like shape in the radial space between the sliding ring and the supporting ring. The advantage of this assembly is that the annular space of the bearing is provided with a larger number of supporting cams.

According to a further feature of the invention, the flexible webs in the axial plane are S-shaped. This design increases the degree of axial deformability of the bearing ring.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DESCRIPTION OF THE DRAWINGS

In the drawings:

FIG. 3 is a section through a bearing ring having a flexible web;

FIG. 4 is a section through a bearing ring having an S-shaped, flexible web; and FIG. 5 is a sectional view showing a wide angle joint with the protective funnel being supported by a bearing ring in accordance with the invention.

DETAILED DESCRIPTION OF THE PREFERRED EMBODIMENTS

Figure 1:
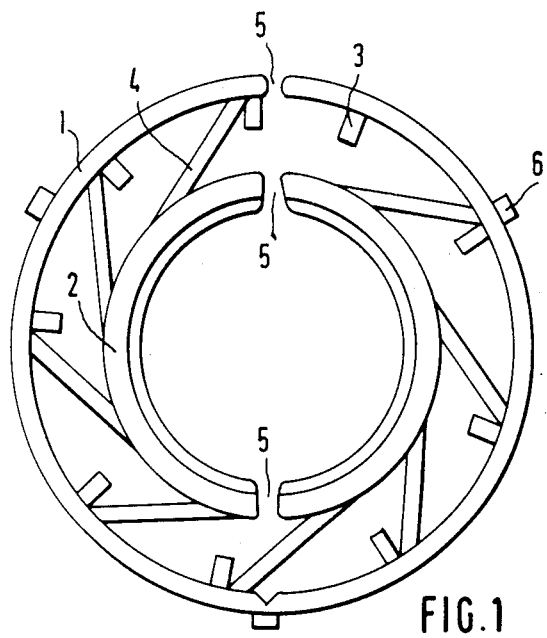
FIG. 1 is a plan view illustrating the basic design of a bearing ring in accordance with the invention.

FIG. 1 shows the basic design of a bearing ring in accordance with the invention. The bearing ring consists of an outer supporting ring 1 and an inner sliding ring 2 which are connected to each other by flexible webs 4. In FIG. 1, the outer supporting ring 1 has been provided with radially inwardly extending supporting cams 3 which limit the radial deformability and degree of eccentricity achievable between the supporting ring 1 and the sliding ring 2. The supporting cams 3 could equally well be provided at the inner sliding ring 2. The outer circumference of the supporting ring 1 has been provided with radially outwardly extending projections 6 which nonrotatingly connect the bearing ring to the part of the protective device to be supported.

The sliding ring 2 has been provided with two slots 5 and the supporting ring 1 with one slot 5 which permit the bearing ring to be slipped onto the wide angle joint.

Figure 2:
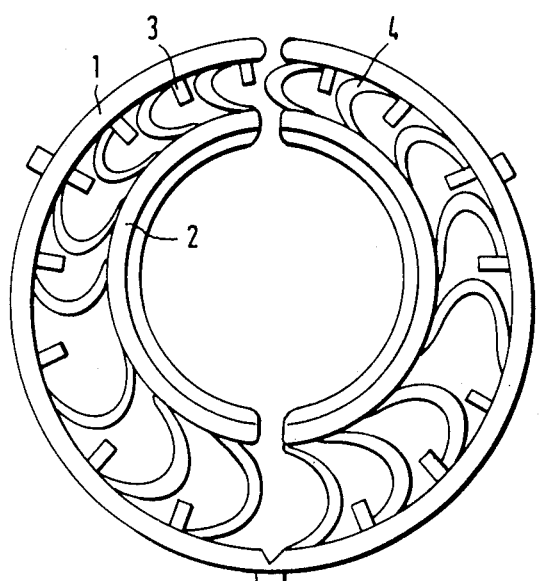
FIG. 2 is a plan view showing a bearing ring with arch-like, flexible webs in an eccentric position occurring under radial loads.

FIG. 2 shows a bearing ring provided with arch-like,, flexible connecting webs 4. The supporting ring 1 and the sliding ring 2 are eccentrically offset relative to each other, i.e., they are drawn in a position, such as it occurs under a load acting radially on the protective device.

FIG. 3 shows a cross-section of a bearing ring in accordance with the invention. In the axial direction, the supporting ring 1 is wider than the sliding ring 2. In this case, it is proposed to arrange the supporting cams 3 at the inner sliding ring 2 in order to provide them at the outer supporting ring 1 and also under an axial offset with a sufficiently large supporting face. The same effect could be achieved if, in the axial direction, the supporting cams 3, at least as far as their faces contacting the counter ring are concerned, are of a correspondingly wide design.

FIG. 4 shows a bearing ring whose flexible webs are of an S-shaped design. This permits a relatively large axial offset between the supporting ring 1 and the sliding ring 2.

Each of the embodiments of FIGS. 3 and 4 includes a sliding collar 7.

FIG. 5 illustrates a wide angle joint 8 including the protective device. The protective device consists of a protective dish 9 which is supported on a wide angle joint 8 by the bearing ring and embraces the wide angle joint essentially completely. The right-hand side of FIG. 5 shows a protective funnel 10 providing additional cover.

If an outer joint yoke 11 contacts the protective dish 9, the latter, through flexibility of the bearing ring, is capable, within certain limits, of giving way without restricting the angle of the wide angle joint.

Thus, it will be seen that the invention provides a bearing ring for the bearing assembly of a protective device on a wide angle joint which, while covering the joint completely and having a high resistance against radial loads, does not in any way limit the maximum joint angle.

In accordance with the present invention, the objective is achieved in that the bearing ring consists of an outer supporting ring 1 and an inner sliding ring 2, that the supporting ring 1 and the sliding ring 2 are connected via flexible webs 4, that the supporting ring 1 or the sliding ring 2 has been provided with supporting cams 3 extending radially into the annular space formed between the two rings, and that the sliding ring 2, in two places, and the supporting ring 1, in one place, have been provided with radial slots 5, with the three points of intersection being positioned on a joint center line.

While specific embodiments of the invention have been shown and described in detail to illustrate the application of the inventive principles, it will be understood that the invention may be embodied otherwise without departing from such principles.

What is claimed is:

1. A bearing ring for a protective funnel for protecting the wide angle joint associated with a drive assembly for effecting a driving connection between an agricultural implement and a power takeoff shaft of a tractor, with the protective funnel being stationary during operation of the drive shaft and being protected via a bearing from the wide angle joint, said bearing ring comprising:
   an outer supporting ring and an inner sliding ring defining an annular space therebetween;
   flexible webs connecting said outer supporting ring and said inner sliding ring together;
   supporting cams provided on one of said supporting ring and said sliding ring extending radially into said annular space therebetween; and
   radial slots provided in two places on said sliding ring and in one place on said supporting ring with three points of intersection being positioned on a joint center line.

2. A bearing ring according to claim 1, wherein said flexible webs extend in an arch-like shape in a radial plane between said sliding ring and said supporting ring.

3. A bearing ring according to claim 1, wherein said flexible webs have an S-shaped configuration as viewed in an axial plane of said bearing ring.

* * * * *